Oct. 20, 1953   D. M. LENTZ   2,656,448
HEATED WIPER MECHANISM
Filed Nov. 22, 1950
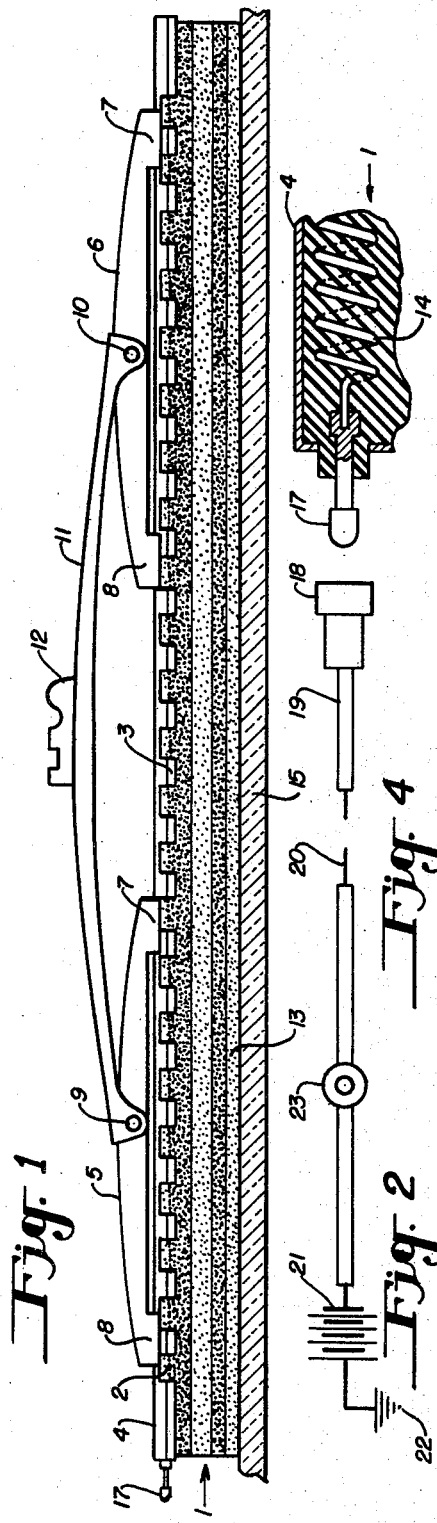
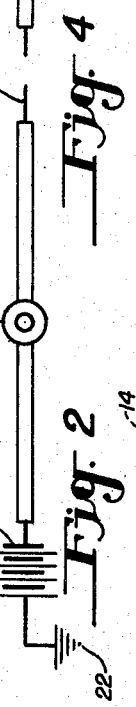
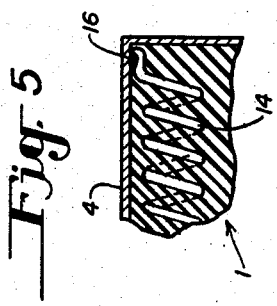
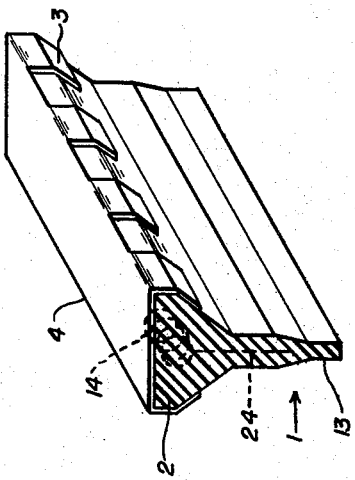
INVENTOR.
DAVID M. LENTZ
BY
ATTORNEY Patented Oct. 20, 1953

2,656,448

UNITED STATES PATENT OFFICE 2,656,448

HEATED WIPER MECHANISM

David M. Lentz, Maple Heights, Ohio

Application November 22, 1950, Serial No. 197,056

1 Claim. (Cl. 219—19)

This invention relates in general to wiping devices for cleaning vehicle windshields, and the like, and more particularly to mechanism combined therewith for transfer of heat for preventing the freezing of moisture collected on the windshield surface.

The primary object of my invention is to provide an improved device in which, at no sacrifice to the cleansing action of the wiper blade, I am able to obtain the maximum heat transfer efficiency to the wiper blade and the windshield surface that will be sufficient for the elimination of ice formation on the windshield surface under all operating conditions.

Another object is to also provide means for heat transfer to the metal backing and blade operating mechanism to prevent ice formation thereon that might otherwise interfere with the proper operation of the wiper mechanism.

With the foregoing and other objects in view, my invention resides in the combination of parts and in the details of construction hereinafter set forth in the following specification and appended claim, certain embodiments thereof being illustrated in the accompanying drawings, in which:

Figure 1 is a plan view of the wiper and metal backing, and a view in section of the windshield.

Figure 2 is a view in cross section taken through the wiper blade;

Figure 3 is a view in perspective of a section of the wiper blade and metal backing plate.

Figure 4 is a view in longitudinal section through an end portion of the wiper blade, and metal back plate, showing the resistance wire outlet and also diagrammatically showing the remainder of the electrical system, including a lead wire, rheostat, battery and ground; and Figure 5 is a fragmentary sectional view of an end portion of the wiper blade and metal back plate, showing the resistance wire connected to the back plate.

The wiper blade, generally indicated at 1, has an enlarged portion 2 for engagement by a series of clips 3 to be removably secured to a metal casing, or back brace 4. This casing 4 is adapted to be removably secured to a blade carrier, shown in Figure 1 to include a pair of members 5 and 6, with end clips 7 and 8 for engaging the casing 4, and pivoted at 9 and 10 to a cross arm 11 having a bracket 12 for convenient releasable attachment to the conventional wiper operating arm, not shown. In Figure 1, the rubber wiper blade is shown in contact with a section of a glass windshield 15. The wiper blade 1 has a thin body portion 13 adjacent and including its windshield engaging surface.

Completely embedded in and moulded in the solid rubber wiper blade 1 throughout its length is a bare uninsulated electrical resistance heating wire, shown at 14 as being in the form of a coil, although it may take other forms and even be straight. The resistance wire 14 is preferably electrically connected at its one end at 16 to the metal back brace 4. To the other end of wire 14 may be connected a member 17 for releasable attachment to a jack plug 18 carried by an insulated conduit 19 which carries a conductor wire 20 to battery 21 to ground 22. In between the jack plug 18 and the battery 21 is a rheostat 23 for varying the current supply from the battery to the resistance wire. If desired, and in order to insure greater heat transfer from the resistance wire to the narrow glass surface engaging portion 13 of the wiper blade, the resistance wire, when moulded in the rubber blade, may include longitudinally flexible metal strips, such as shown at 24 in Figure 3, extending at right angles to the major portion of the longitudinally extending wire 14.

Of primary consideration is the use of heat resistant rubber, which is available, and which can stand high temperatures approximately 500 degrees Fahrenheit without damage to the rubber or in any way lessening the cleansing characteristics of the blade in its windshield wiping operations. With the use of such a rubber, I mould it in one solid piece with the bare electrical resistance wire inside throughout its entire length and in direct contact with the solid body of the rubber blade with no thermal insulation or air gap therebetween. This allows me to obtain high heat transfer from the electrical source through the blade to the windshield surface. The fact that the rubber blade is moulded in one piece also permits greater heat transfer and higher efficiency with respect to electric current output. A laminated blade would provide for air gaps between the laminations which would lessen heat transfer efficiency. The use of the rheostat enables the operator to obtain the required heat transfer as desired.

In my diagrammatical showing of the circuit in Figure 4, I have shown a battery, but it is to be understood that this is to illustrate a current source. In use in automotive vehicles, the source may be an outlet comparable to a cigar lighter that is common upon dashboards.

Another item of importance is the electrical connection 16 between the wire 14 and the metal casing 4. This connection may take other forms, such as a clip. The importance of this feature lies in the transfer of heat to the metal backing, supports and operating arms to eliminate ice formation thereon which might otherwise result in malfunction of the assembly. My device may obviously be used to good advantage, not only in connection with vehicle windshields, but for any use where it is desired to wipe a surface clean and avoid ice formation on the surface. Its simplicity and inexpensiveness in construction is also an item of importance.

The illustrated showing of the rheostat is meant to include means for regulation, as well as the turning off, of heat transfer, when temperature conditions are such that no heat transfer is required, the jack plug 18 may be removed which disconnects the heat source from the wiper blade assembly. That part of the assembly from the jack plug 18 to the plug for the source may be inserted when needed and stored away when not needed.

Moreover, my device is of utmost advantage in use in a vehicle employing a windshield defroster. Even if the defroster keeps the windshield surface clean and free of ice, temperature conditions still cause ice formation on the wiper blade. In my device this condition is eliminated because the heat transfer to the blade de-ices the blade and the windshield.

I claim:

In a windshield wiper system for vehicles including a source of electrical power and a windshield traversing mechanism, a channeled metallic casing secured to said traversing mechanism, a wiper blade having an enlarged head portion carried immovably within the confines of the metallic casing and having a flexible depending blade portion for engaging a windshield, said wiper blade being constructed of a high heat resistant rubber, a thermally non-insulated electrical resistance member molded within the enlarged portion of said wiper blade adjacent to the metallic casing for good heat transfer relationship therewith and connected at one end to the source of power and at the other end to the metallic casing, and a flexible metallic heat conducting strip running longitudinally through the depending portion of the blade, the upper edge of said strip being in contact with said resistance member.

DAVID M. LENTZ.

References Cited in the file of this patent

UNITED STATES PATENTS

| Number | Name | Date |
|---|---|---|
| 1,510,015 | Rayfield | Sept. 30, 1924 |
| 1,573,727 | Margranis et al. | Feb. 16, 1926 |
| 1,615,612 | Brees | Jan. 25, 1927 |
| 1,649,848 | Nixon | Nov. 22, 1927 |
| 1,733,546 | Londino | Oct. 29, 1929 |
| 1,733,848 | Deuel et al. | Oct. 29, 1929 |
| 1,980,254 | Cartwright | Nov. 13, 1934 |
| 2,302,780 | Le Clair | Nov. 24, 1942 |
| 2,550,504 | Vidrick et al. | Apr. 24, 1951 |